US006209567B1

(12) United States Patent
Gustafson

(10) Patent No.: US 6,209,567 B1
(45) Date of Patent: Apr. 3, 2001

(54) FOAM TRAP FOR BEER OR OTHER GAS PROPELLED LIQUID DISPENSING SYSTEMS

(75) Inventor: Robert C. Gustafson, Windham, NH (US)

(73) Assignee: Vernon C. Maine PLLC, Nashua, NH (US)

( * ) Notice: Subject to any disclaimer, the term of this patent is extended or adjusted under 35 U.S.C. 154(b) by 0 days.

(21) Appl. No.: 09/388,408

(22) Filed: Sep. 1, 1999

Related U.S. Application Data

(60) Provisional application No. 60/098,714, filed on Sep. 1, 1998.

(51) Int. Cl.[7] .................................................. F16K 24/00

(52) U.S. Cl. ........................ 137/170.2; 137/173; 137/192

(58) Field of Search ................................ 137/170.2, 173, 137/192

(56) References Cited

U.S. PATENT DOCUMENTS 5,564,459 * 10/1996 Dunne ........................... 137/170.2 X
6,082,389 * 7/2000 Latham et al. .................... 137/170.2

FOREIGN PATENT DOCUMENTS 2286581A 8/1995 (GB) .

OTHER PUBLICATIONS

Metallocraft FOB Detector FB01, Metallocraft & Engineering Ltd, Dublin, Ireland (Updated).
Banner Profit Guard PG–1, Franklin Park, Illinois (Updated).
1999 Foxx Equipment Company Catalog 20D03–429, Foam Preventer 07D08–101.
Ajax USA Draught Beer Equipment Catalog vol. 2, #129700 Empty Beer Keg Shut–Off (Updated).

* cited by examiner

*Primary Examiner*—Gerald A. Michalsky
(74) *Attorney, Agent, or Firm*—Vernon C. Maine; Scott J. Asmus

(57) ABSTRACT

A foam trap or FOB for a gas propelled or mechanically pumped liquid dispensing system, having an upper ball stopper valve seat and gas vent port at the top and a lower ball stopper valve seat and liquid outlet port at the bottom, with two floating ball stoppers that are raised and lowered by the level of liquid unless locked into a seated position on a valve seat by pressure. Ball stoppers can be independently mechanically dislodged and constrained from reseating on either valve seat by externally accessible means. The interior geometry inhibits the ball stoppers from competing or blocking access to respective valve seats when liquid is falling or rising. The trap automatically shuts off outflow when liquid is depleted, permitting a container change, opening of the vent port, and purging of gas or air in the trap by refilling the trap with liquid before closing the vent port and reopening the outflow. The trap may be integrated into an automated container switching system for liquid dispensing systems.

21 Claims, 5 Drawing Sheets

FOAM TRAP FOR BEER OR OTHER GAS PROPELLED LIQUID DISPENSING SYSTEMS

This application claims priority to pending U.S. Provisional application Ser. No. 60/098,714, filed Sep. 01, 1998.

BACKGROUND OF THE INVENTION

1. Technical Field of the Invention

This invention relates to devices for preventing the foam and froth that surges out of a gas propelled liquid container, or from a system using a mechanical pump, when the liquid supply is depleted, from passing into the distribution lines of the dispensing system to which it is attached. This invention relates more particularly to a foam trap, or FOB as it may be called, for keeping the froth from a near-empty beer keg or the like from entering the dispensing lines that carry the beverage to the tap.

2. Background Art

Beer and other carbonated beverages, when poured carefully into a glass or mug for an individual serving, generate a natural head of foam that, when not excessive, tends to enhance the presentation and taste of the beverage for the consumer. In a commercial setting such as a restaurant or tavern, the beer is dispensed from a "remote" beer dispensing system.

To transport the beer from the cooler to the point of dispensing, the beer travels through a beer conduit, an insulated bundle of beer lines and coolant lines. The beer is typically propelled by gas pressure applied over the beer in the keg. The keg is said to "kick" as it empties, when the level of the liquid beer falls below the discharge outlet in the keg. When this occurs, a frothy mixture of propellant gas and residual beer are blown out through the beer lines or hoses. When this happens, it causes at best an erratic, unsatisfactory, gassy pour of the residue that is difficult or impossible to control at the tap. To resume satisfactory dispensing of liquid beer, the lines must be repacked, refilled with beer and the gas displaced.

Various designs of foam traps or FOBs as they may be called, are presently in commercial use to prevent the entrance of excessive foam into the distribution lines as the keg hits empty, with shutoff valves that hold the liquid in the lines while the empty keg is being replaced or the system is being switched to an already connected next keg. The prior art of Francisco Moreno Barbosa, as expressed in UK Patent GB2286581 is instructive, as are the examples of commercial products accompanying this application. Most devices use a float to seal the outlet of a reservoir to which the beer lines are attached when the level of liquid in the reservoir falls low. There is an alternate device that operates on a fluid momentum theory, gas versus liquid. All have inherent problems with cost, operation, sanitation, reliability or maintenance.

There are many commercial and industrial processes that use gas-propelled liquid pumping or dispensing systems, where it is likewise desirable to prevent or control the amount of foam entering the distribution lines. Liquid dispensing systems using vented containers and mechanical pumps are also subject to the same problem, when the liquid level in a vented tank or container falls to level of the outflow port or suction tube so that air is being sucked into the pump along with the residual liquid.

SUMMARY OF THE INVENTION

It is among the objects of the invention to keep the distribution lines that transport the beer or other liquid in a mechanically pumped or gas propelled liquid dispensing system, full of liquid at all times, and free of propellant gas, air, or foam, by utilizing a novel foam trap or FOB connectable to a liquid container or a manifold to which are connected multiple containers.

It is further among the objects of the invention to employ the trap in an automated control system on a liquid dispensing system pre-connected by a manifold to multiple containers, to sequence the containers when empty without introducing gas or air into the dispensing system.

The FOB has a reservoir or chamber into which the liquid is piped. The chamber is of suitable interior volume with respect to the viscosity and flow rate of the liquid to act as a coarse gravity separator of the liquid and gas when gas enters the supply line from the container. The chamber has two outlets, an upper gas vent outlet for discharge, and a lower liquid outlet to which the distribution lines are attached. Each outlet is configured with a horizontally oriented valve seat suitable to accept a vertically displaced spherical closing member or floating ball stopper in a sealing relationship. Within the chamber there is a free floating ball stopper for each valve seat, suitable for sealing its respective valve seat when moved and held against it by pressure or gravity. The FOB also has externally accessible mechanisms for restraining the seating of or for unseating either of the balls independently, when desired. The geometry of the chamber, valves and balls is such that the balls do not compete for either valve seat when both are afloat in rising or falling liquid.

To initiate use, the liquid outlet ball sealing restraint is put in place to insure that the outlet port ball stopper is loose, and the gas vent outlet ball seating restraint is disengaged or removed to allow automatic closure. When liquid enters the chamber from the liquid containers, both ball stoppers are raised with the rising liquid level, and the gas vent ball is floated into place on the vent valve seat, closing the vent port. The ball stopper is held in place by the pressure of the liquid and gas in the system. When maximum pressure is reached, the liquid outlet ball sealing restraint is removed to permit automatic closure, but the liquid outlet ball stopper is still being floated by the liquid in the chamber so the liquid outlet remains open to pass liquid through the lines to the dispensing point until the liquid level drops.

When the container in use is exhausted and "kicks", and the liquid in the trap chamber goes low as it is replaced by propellant gas or air in the system, the liquid outlet is closed and sealed by its ball stopper so that gas or air does not enter the distribution lines. Meanwhile, the gas vent ball stopper remains in place under pressure, maintained by a check valve at the container end of the liquid supply line. Sensing the low pressure in the dispensing line, the operator or the system controller changes or switches to a full container and the supply of liquid is re-established. Thereupon, the gas vent ball stopper is the unseated to open the vent port, and the restraint then removed. This permits the flow of liquid into the chamber to empty the gas and reseat the vent ball. When the vent has closed and the chamber has stabilized at maximum pressure, the liquid outlet ball stopper is unseated and the restraint then removed to resume normal operation.

It is further among the objects of the invention to provide a FOB that is constructed of materials suitable for contact with food, rugged and reliable, simple to use. hygienic in that it has minimal crevices in the food zone, is easy to disassemble, clean and maintain, and is suitable for regulatory approval. It is yet further among the objects of the invention to utilize principles of symmetry of design and commonality of parts for similar functions to minimize the number of unique parts.

It will be apparent to those skilled in the art, that the invention functions with carbonated or gaseous liquids or fluids, with mixtures of gas and liquid, and with liquids or fluids that are either gas-propelled or mechanically pumped from a container into which replacement air or gas or gaseous fluid flows.

Still other objects and advantages of the present invention will become readily apparent to those skilled in this art from the following detailed description, wherein we have shown and described only a preferred embodiment of the invention, simply by way of illustration of the best mode contemplated by us in carrying out our invention.

DESCRIPTION OF THE PREFERRED EMBODIMENT

The invention is susceptible of many variations. Accordingly, the drawings and following description of the preferred embodiment are to be regarded as illustrative in nature, and not as restrictive.

Figure 2:
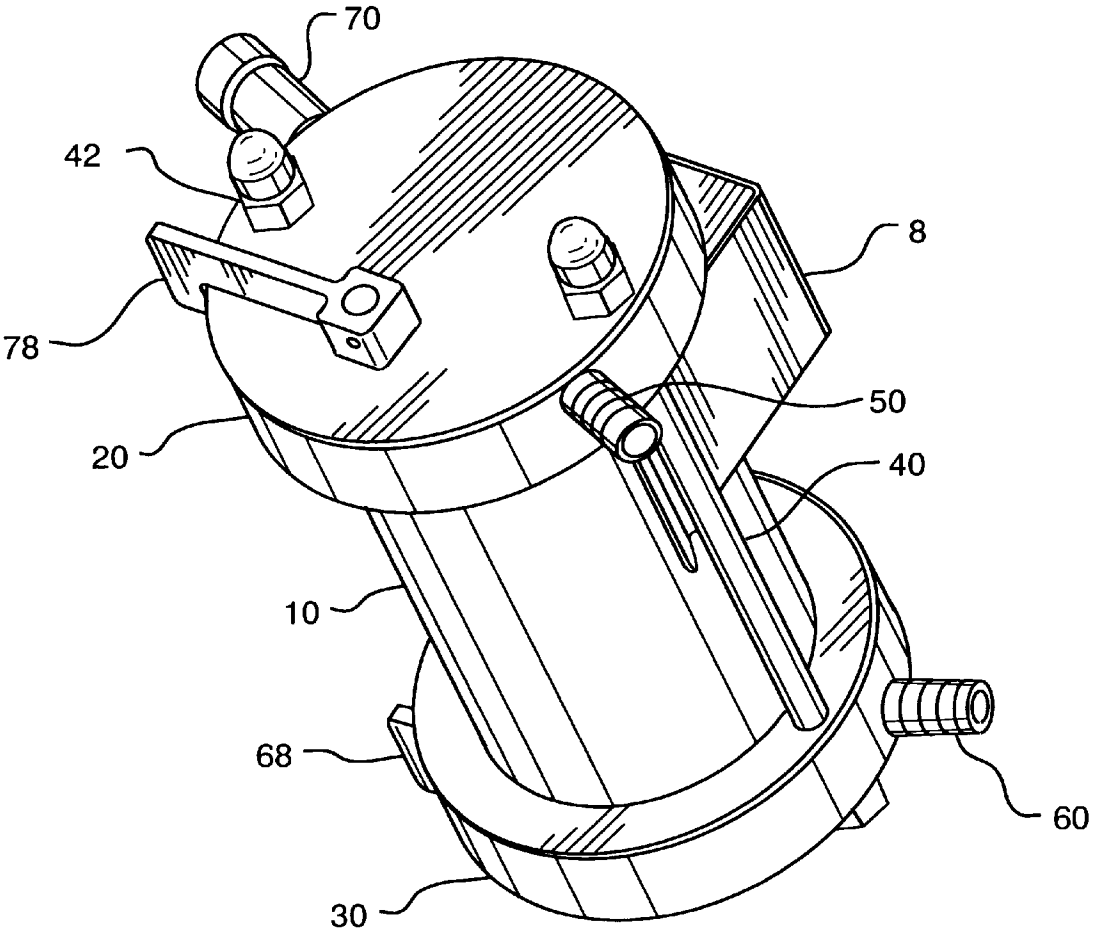
FIG. 2 is an isometric view of the preferred embodiment.
Figure 3:
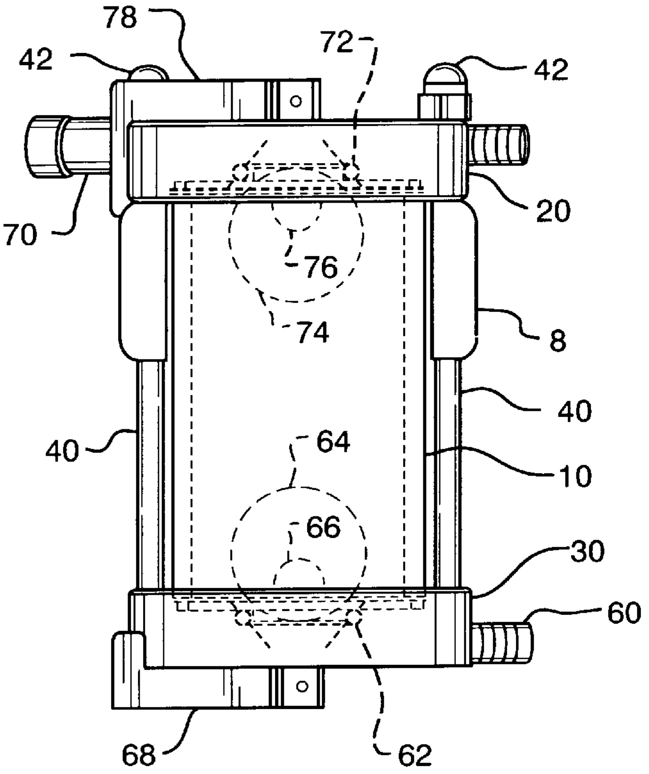
FIG. 3 is a front view of the embodiment of FIG. 2, with dotted line representation of hidden details.
Figure 4:
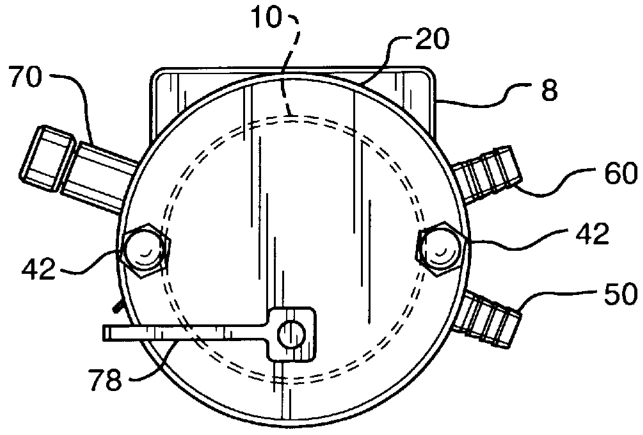
FIG. 4 is a top view of the embodiment of FIG. 2, with dotted line representation of hidden details.
Figure 5:
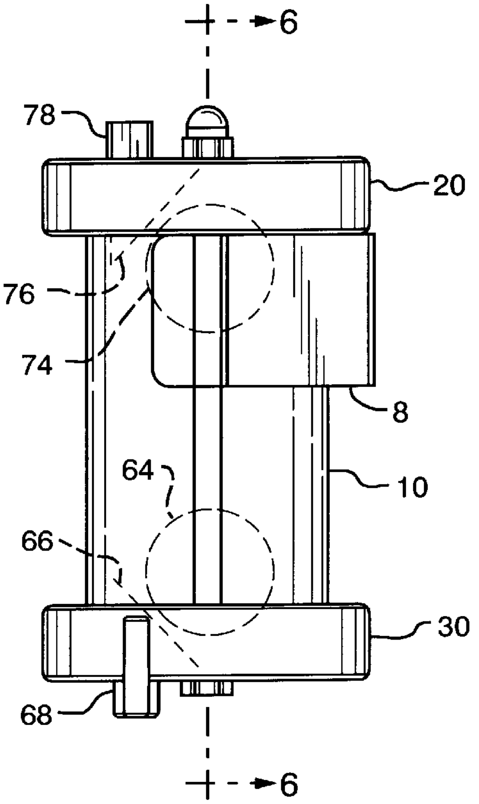
FIG. 5 is a side view of the embodiment of FIG. 2, with dotted line representation of hidden details.
Figure 6:
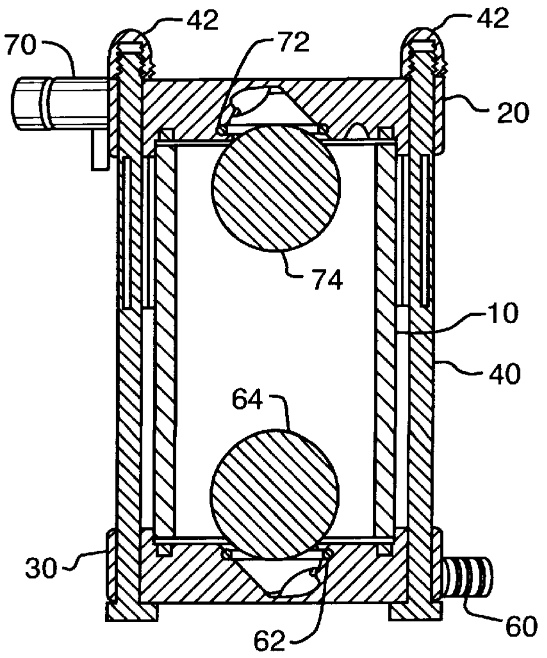
FIG. 6 is a section view of the side view of FIG. 5, showing the two check balls in proximity to the upper and lower ports.

Referring to FIG. 2, a foam trap or FOB for a beer dispensing system consists of a transparent cylinder section 10, top 20, and bottom 30, clamped together with bolts 40 and cap nuts 42 to form a chamber or reservoir. Top 20 has beer inlet 50 for connecting to a beer keg, and gas vent 70 for purging gas from the dispensing system. Bottom 30 has beer outlet 60 for admitting beer into the beer lines connecting to the taps. Bracket 8 is used to secure the FOB to a wall or other support structure. Beer inlet 50 can be located in bottom 30, rather than top 20.

Referring to FIGS. 3–6, outlet 60 and gas vent 70 are terminated in the FOB by respective valve seats 62 and 72, both of the same size. Ball stoppers 64 and 74 are each of suitable size to seat and seal in valve seats 62 and 74. Valve wedges 66 and 76 are independently rotable about 90 degrees back and forth by respective external levers 68 and 78 so as in one position to be clear of any interference with seating of a ball stopper in the valve seat, and when moved into in the other position to unseat a ball stopper from its valve seat and to obstruct any reclosing of the valve until the lever is moved back to the non-interfering position.

Figure 1:
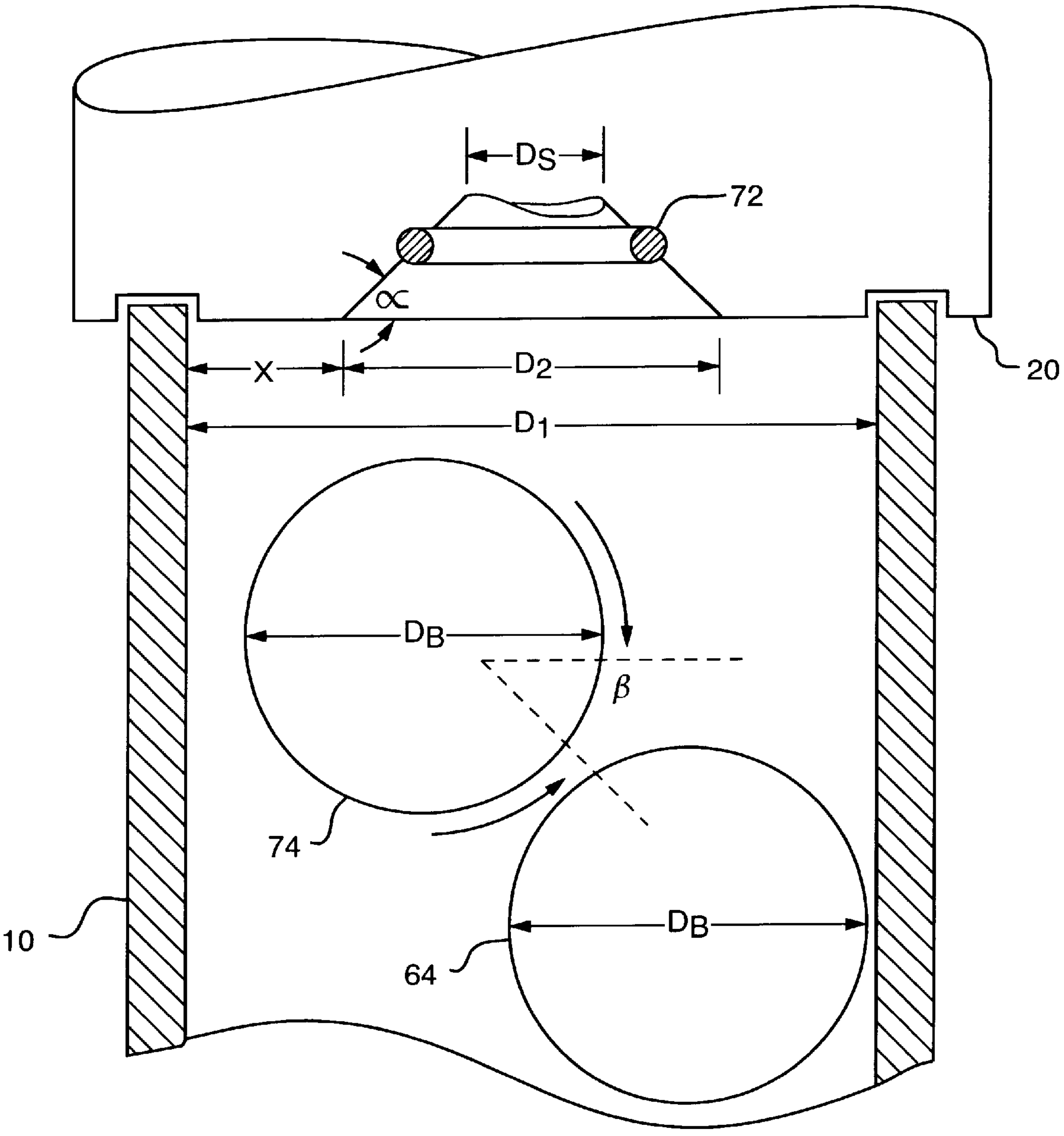
FIG. 1 is a diagrammatic view of the top end of the chamber of the preferred embodiment, with ball stoppers and valve seat, illustrating geometric considerations in size and proportion.

Referring to FIG. 1, the geometry of the chamber, ball stoppers and valve seats is substantially the same for outlet 60 and gas vent 70, and is particularized to provide for commonality of parts, including same size ball stoppers and valve seats, and to prevent entrapment of one ball stopper in the corner of the chamber by the other ball stopper when both are free floating in the chamber. The valve seats are centered at their respective ends of the chamber.

To support the gas vent ball stopper;

$$P_{min}\pi D_S^2/4 > \text{weight of ball},$$

$P_{min}$=minimum pressure $D_S$=diameter of valve seat $$\text{weight of ball stopper} = \delta\pi D_B^3/6$$

$\delta$=density $D_B$=diameter of ball stoppers

For valve seat sealing at 45° tangent against the ball stopper;

$$D_S = \sqrt{2}D_B/2$$

For the ball to find the sealing surface of the valve seat;

$$(D_1 - D_2)/2 = X, X < D_B/2$$

$D_1$=interior diameter of cylinder

So that both ball stoppers don't get wedged when floating;

$$\beta = \cos^{-1}((D_1 + D_B)/D_B),$$

$D_1 < 2D_B$, and $D_1 = D_B(1+\cos\beta)$ $\beta$=angle off horizontal between ball stoppers in contact The flow area A for beer around the floating ball is;

$$A = \pi((D_1^2 - D_B^2)/4)$$

During normal operation of the preferred embodiment, inlet 50 is connected to a beer keg, the gas vent 70 is sealed by ball stopper 74 in valve seat 72, the chamber is fill of beer, outlet 60 is open and ball stopper 64 is floating at the top of the chamber, and beer is flowing through the FOB when the tap is opened. When the keg is empty, operation of the FOB is as follows:

1. The keg "kicks" and gas begins filling the chamber of the FOB. The floating ball stopper falls with the falling level of beer.
2. The level of beer gets sufficiently low that the floating ball stopper is pushed into the beer outlet valve seat by the gas pressure. The ball in the gas vent seat is still held in place by the gas pressure inside the FOB.
3. At this point the beer has stopped flowing at the tap as the ball stopper has blocked the flow. The distribution lines remain full of beer. A new keg is attached or switched on the inlet line.
4. The operator moves the top lever and gas vent valve seat cam on the FOB to unseat the vent valve ball stopper, and returns the lever and cam to its non-interfering position. The ball stopper drops and gas escapes out the vent. As the gas escapes, beer begins to fill the chamber from the new keg.
5. Once the beer level approaches the top of the chamber, the vent is sealed by the floating gas vent ball stopper.
6. Now the operator operates the lower lever and outlet valve seat cam to unseat the outlet valve ball stopper, and returns it to its non-interfering position. The ball stopper floats to the top and beer flows again when the tap is opened.

Figure 7:
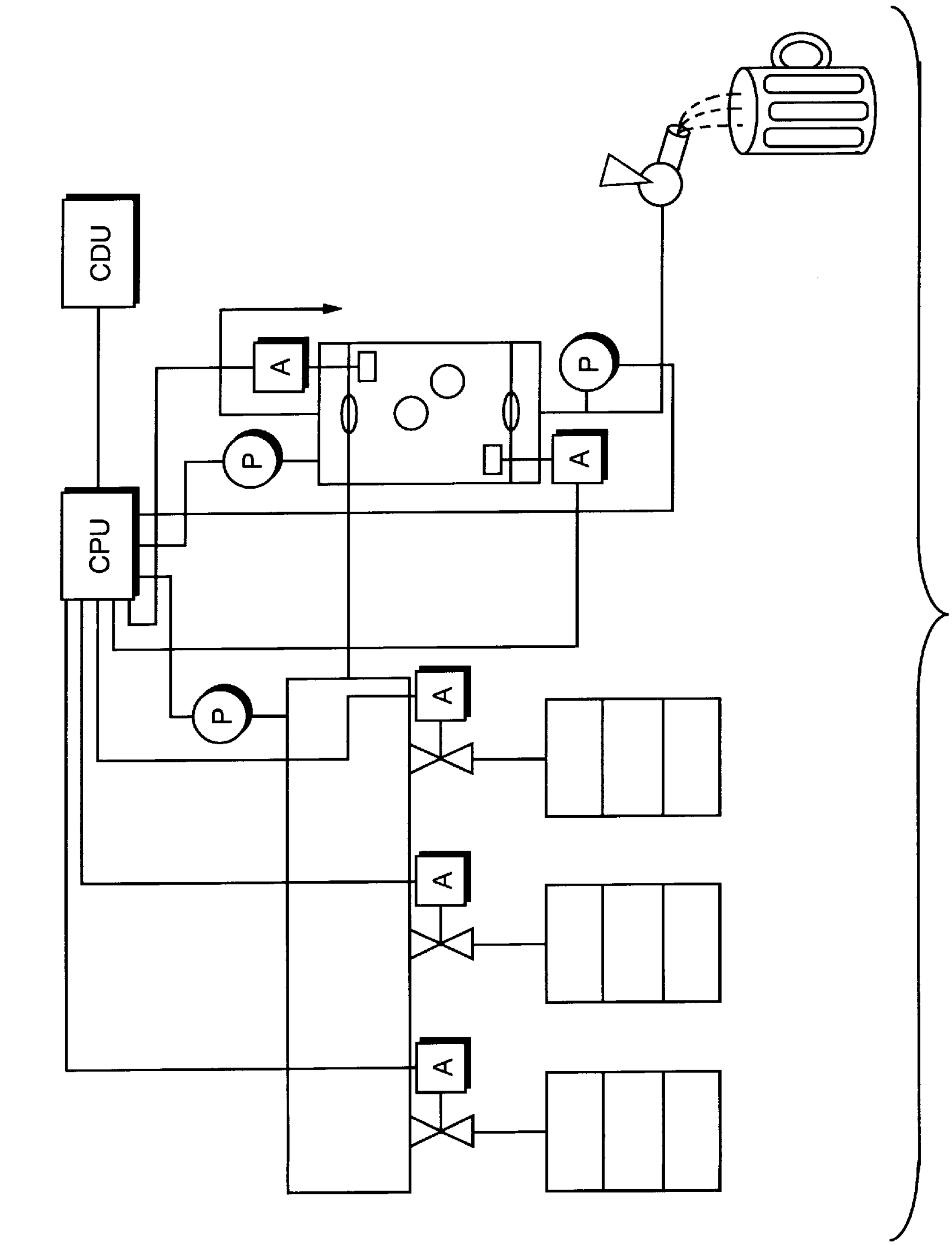
FIG. 7 is a diagrammatic view of an automated system for sequencing containers, employing the embodiment of FIG. 2.

Referring to FIG. 7, an automated container switching system employing the foam trap of FIG. 2 is diagrammed. Pressure sensors P at the manifold, foam trap, and dispensing line are inputs connected to a central processing unit which is connected to a control/display unit. Outputs from the CPU control actuators A at the manifold valves and at the upper and lower foam trap valve seat cams. Algorithms consistent with the principles disclosed above, are used to operate the container switching system in an automated or semi-automated mode, after a bank of full containers has been connected.

The description and drawings of the preferred embodiment clearly illustrate the principles of the invention. As will be realized, the invention is capable of other and different embodiments, and its several details are capable of modifications in various obvious respects, all without departing from the essence of the invention.

For example, it is within the scope of the invention to provide a foam trap for a liquid dispensing system consisting of a closed container with an inlet port connectable to a source of the liquid, an upper ball stopper valve seat and gas vent port located at the top of the interior of the container and connectable to a gas discharge line, with the valve seat open downward so as to accept and seat a floating ball stopper when the level of liquid rises in the container rises to the top and floats the ball stopper into position so that the liquid is checked from entering the gas discharge line.

A similar lower ball stopper valve seat and liquid outlet port connectable to a liquid supply line are located at the bottom of the interior of the container with the valve seat facing upward so as to close the outflow port when a ball stopper floats into place on the valve seat. There are two floating ball stoppers loose in the container, which arc raised and lowered by the level of liquid unless locked into a seated position on a valve seat by pressure. The foam trap also has means for dislodging and constraining either said ball stopper from reseating in either said valve seat.

The foam trap may consist of a vertically oriented cylinder configured with a detachable top plate and a detachable bottom plate. The top plate may incorporate the upper ball stopper valve seat and gas vent port, and the bottom plate incorporate the lower ball stopper valve seat and liquid outlet port. The upper ball stopper valve seat and lower ball stopper valve seat may be the same size, and the two floating ball stoppers may be the same size. The interior geometry of the container may be configured to prevent cross-interference of seating of the ball stoppers in the valve seats, so that the ball stoppers are not competing for or blocking each other from being floated into position. All or substantial components of the foam trap may be made of stainless steel or other components that meet hygienic and regulatory requirements or are otherwise desirable for the application. The foam trap may be transparent or have a transparent window so that the level of liquid is easily visually discernible for verification by the operator.

As another example, the means for dislodging and constraining the ball stoppers from reseating in a valve seat may include the use of a rotable cam positioned adjacent to each valve seat so that the cam surface may be rotated into or out of the zone of the valve seat so as to interfere with the normal seated position of the ball stopper. If the ball stopper is present, it is dislodged and the respective port is opened to outflow. The ball stopper is constrained from reseating on the valve seat under all circumstances until the cam is rotated to a non-interfering position. The cams are each connected by cam shafts extending through the plates to respective, independent external means for rotating the cams. The means for rotating may be or include both a manually operable lever that may be moved so as to rotate the cam between interfering and non-interfering positions, or a remotely operable indexed and powered rotary mechanism that may either be switched between interfering and non-interfering positions or advanced rotationally in one direction between positions.

As yet another example, there is within the scope of the invention, a foam trap for a gas propelled liquid dispensing system consisting of a closed, transparent container having an inlet port connectable to a source of liquid that is being contained under pressure by a gas. The container may have an upper ball stopper valve seat and gas vent port connectable to a gas discharge line, and a lower ball stopper valve seat and liquid outlet port connectable to a liquid supply line, with two floating ball stoppers loose in the container. The container may be equipped with means for dislodging and constraining the ball stoppers from reseating in either valve seat. The container may consist of a vertically oriented transparent cylinder configured with a detachable stainless steel top plate and a detachable stainless steel bottom plate. The top plate may incorporate the upper ball stopper valve seat and gas vent port. The bottom plate may incorporate the lower ball stopper valve seat and liquid outlet port.

As in other variations, the upper valve seat and the lower valve seat may be the same size and the two floating ball stoppers be the same corresponding size. The interior geometry of the container may be configured to prevent cross-interference of seating of the ball stoppers in respective valve seats. The means for dislodging and constraining the ball stoppers from reseating in the valve seats may include rotable cams adjacent to each valve seat and connected by cam shafts through the plates to respective external levers.

As still yet another example, the sensing of pressure at key points in the system, and the switching of outlet valve seat cams and manifold valves as illustrated and described, can be integrated with the FOB or foam trap into an automated control system using readily available components, to provide automatic sequencing of containers connected to a switchable manifold without introducing gas or air into the dispensing lines. Other parameters indicating the operating state of the system can also be used. Further enhancements, including sensing and control of system cooling can be integrated into the automated system.

I claim:

1. A foam trap for a liquid dispensing system comprising:

a closed container having an inlet port connectable to a source of said liquid, an upper ball stopper valve seat and gas vent port connectable to a gas discharge line, and a lower ball stopper valve seat and liquid outlet port connectable to a liquid supply line, two floating ball stoppers loose in said container, and means for dislodging and constraining either said ball stopper from reseating in either said valve seat.

2. The foam trap of claim 1, said container comprising a vertically oriented cylinder configured with a detachable top plate and a detachable bottom plate.

3. The foam trap of claim 2, said top plate comprising said upper ball stopper valve seat and gas vent port, said bottom plate comprising said lower ball stopper valve seat and liquid outlet port.

4. The foam trap of claim 3, said upper ball stopper valve seat and said lower ball stopper valve seat being the same size, and said two floating ball stoppers being the same size.

5. The foam trap of claim 3, said means for dislodging and constraining either said ball stopper from reseating in either said valve seat comprising a rotable cam adjacent to each valve seat and connected by a cam shaft through respective said plates to respective external means for rotating.

6. The foam trap of claim 5, said means for rotating comprising a manually operable lever.

7. The foam trap of claim 5, said means for rotating comprising a remotely operable indexed and powered rotary mechanism.

8. The foam trap of claim 1, said upper ball stopper valve seat and said lower ball stopper valve seat being the same size, and said two floating ball stoppers being the same size.

9. The foam trap of claim 8, the geometry of said container configured to prevent cross-interference of seating of said ball stoppers in respective said valve seats.

10. The foam trap of claim 1, the geometry of said container configured to prevent cross-interference of seating of said ball stoppers in respective said valve seats.

11. The foam trap of claim 1, said container being transparent for visual indication of liquid level.

12. A foam trap for a liquid dispensing system comprising:

a closed, transparent container having an inlet port connectable to a source of said liquid, an upper ball stopper valve seat and gas vent port connectable to a gas discharge line, and a lower ball stopper valve seat and liquid outlet port connectable to a liquid supply line, two floating ball stoppers loose in said container, and means for dislodging and constraining either said ball stopper from reseating in either said valve seat, said container comprising a vertically oriented cylinder configured with a detachable top plate and a detachable bottom plate, said top plate comprising said upper ball stopper valve seat and gas vent port, said bottom plate comprising said lower ball stopper valve seat and liquid outlet port.

13. The foam trap of claim 12, said upper ball stopper valve seat and said lower ball stopper valve seat being the same size, and said two floating ball stoppers being the same size, the geometry of said container configured to prevent cross-interference of seating of said ball stoppers in respective said valve seats.

14. The foam trap of claim 13, said means for dislodging and constraining either said ball stopper from reseating in either said valve seat comprising a rotable cam adjacent to each valve seat and connected by a cam shaft through respective said plates to respective external means for rotating.

15. The foam trap of claim 14, said cylinder being fabricated of transparent material, said top and bottom plates being fabricated of stainless steel.

16. The foam trap of claim 14, said means for rotating comprising a manually operable lever.

17. The foam trap of claim 14, said means for rotating comprising a remotely operable indexed and powered rotary mechanism.

18. A foam trap for a gas propelled liquid dispensing system comprising:

a closed, transparent container having an inlet port connectable to a source of said liquid contained under pressure by said gas, an upper ball stopper valve seat and gas vent port connectable to a gas discharge line, and a lower ball stopper valve seat and liquid outlet port connectable to a liquid supply line, two floating ball stoppers loose in said container, and means for dislodging and constraining either said ball stopper from reseating in either said valve seat, said container comprising a vertically oriented transparent cylinder configured with a detachable stainless steel top plate and a detachable stainless steel bottom plate, said top plate comprising said upper ball stopper valve seat and gas vent port, said bottom plate comprising said lower ball stopper valve seat and liquid outlet port.

19. The foam trap of claim 18, said upper ball stopper valve seat and said lower ball stopper valve seat being the same size, and said two floating ball stoppers being the same size, the geometry of said container configured to prevent cross-interference of seating of said ball stoppers in respective said valve seats.

20. The foam trap of claim 19, said means for dislodging and constraining either said ball stopper from reseating in either said valve seat comprising a rotable cam adjacent to each valve seat and connected by a cam shaft through respective said plates to respective external levers.

21. An automated switching system for sequencing the liquid containers attached to a liquid dispensing system comprising a central processing unit, a manifold with a multiplicity of inlets connectable to respective liquid containers, each said inlet openable and closable by a respective valve, each said valve having a remotely operable actuator connected to said central processing unit, a foam trap for a liquid dispensing system comprising a closed container having an inlet port connected to said manifold, an upper ball stopper valve seat and gas vent port connectable to a gas discharge line, and a lower ball stopper valve seat and liquid outlet port connectable to said liquid dispensing system, two floating ball stoppers loose in said container, and means for dislodging and constraining either said ball stopper from reseating in either said valve seat, said means employing remotely operable actuators connected to said central processing unit, pressure sensors sensing liquid pressure at said manifold, in said foam trap, and in said liquid dispensing system, said pressure sensors connected to said central processing unit.

* * * * *